(12) United States Patent
Kroupenkine et al.

(10) Patent No.: US 7,618,746 B2
(45) Date of Patent: Nov. 17, 2009

(54) NANOSTRUCTURED BATTERY HAVING END OF LIFE CELLS

(75) Inventors: Timofei Nikita Kroupenkine, Warren, NJ (US); Alan Michael Lyons, New Providence, NJ (US); Steven David Simon, Middletown, NJ (US); Joseph Ashley Taylor, Springfield, NJ (US); Brijesh Vyas, Warren, NJ (US)

(73) Assignees: Alcatel-Lucent USA Inc., Murray Hill, NJ (US); mPhase Technologies, Inc., Norwalk, CT (US)

( * ) Notice: Subject to any disclaimer, the term of this patent is extended or adjusted under 35 U.S.C. 154(b) by 751 days.

(21) Appl. No.: 10/803,576

(22) Filed: Mar. 18, 2004

(65) Prior Publication Data

US 2009/0233156 A1   Sep. 17, 2009

(51) Int. Cl.
  *H01M 6/22* (2006.01)
  *H01M 6/02* (2006.01)
(52) U.S. Cl. .................... 429/188; 429/122; 236/91 R; 977/948
(58) Field of Classification Search .................. None
  See application file for complete search history.

(56) References Cited

U.S. PATENT DOCUMENTS 6,185,961 B1   2/2001   Tonucci et al. ............... 65/60.4
6,603,444 B1 * 8/2003  Kawanami et al. ............ 345/32
7,227,235 B2 * 6/2007  Kroupenkine et al. ........ 257/400

OTHER PUBLICATIONS

Kim, et al., "*Nanostructured Surfaces for Dramatic Reduction of Flow Resistance in Droplet-Based Microfluidics*," IEEE, pp. 479-482 (2002).

* cited by examiner

*Primary Examiner*—John S Maples
(74) *Attorney, Agent, or Firm*—Hitt Gaines, PC

(57) ABSTRACT

A cell-array battery is disclosed having end-of-life cells that can be activated at the end of a battery's life to, illustratively, neutralize the toxic chemicals inside the battery. In one embodiment, neutralization of the electrolyte in the battery is achieved through immobilization of the electrolyte at the end of the life of the battery by, for example, a vitrification process. Using electrowetting techniques, the electrolyte is made to contact a neutralizing substance between the nanostructures in one or more end-of-life cells, thus causing a reaction that results in the electrolyte becoming immobilized by, for example, a polymer substance. In a second illustrative embodiment, when the electrolyte contacts the substance between the nanostructures in one or more end-of-life cells, the chemical composition of the electrolyte is changed into a less toxic chemical compound, thus neutralizing the electrolyte.

13 Claims, 6 Drawing Sheets

Prior Art

Prior Art

US 7,618,746 B2

NANOSTRUCTURED BATTERY HAVING END OF LIFE CELLS

CROSS REFERENCE TO RELATED APPLICATIONS

This application claims subject matter that is described in co-pending United States Patent Application filed simultaneously herewith and entitled "Reserve Cell-Array Nanostructured Battery," Ser. No. 11/803,565 filed Mar. 18, 2004 and United States Patent Application filed simultaneously herewith and entitled "Reversibly-Activated Nanostructured Battery," Ser. No. 10/803,641 filed Mar. 18, 2004.

FIELD OF THE INVENTION

The present invention relates generally to batteries and, more particularly, to batteries having nanostructured surfaces.

BACKGROUND OF THE INVENTION

Many beneficial devices or structures in myriad applications rely on batteries as a power source. A typical liquid-cell battery, such as battery 101 in FIG. 1, is characterized by an electrolyte liquid 102 which provides a mechanism for an electrical charge to flow in direction 103 between a positive electrode 104 and a negative electrode 105. When such a battery 101 is inserted into an electrical circuit 106 with illustrative load 108, it completes a loop which allows electrons to flow uniformly in direction 107 around the circuit 106. The positive electrode thus receives electrons from the external circuit 106. These electrons then react with the materials of the positive electrode 104 in reduction reactions that generate the flow of a charge to the negative electrode 105 via ions in the electrolyte liquid 102. At the negative electrode 105, oxidation reactions between the materials of the negative electrode 104 and the charge flowing through the electrolyte fluid 102 result in surplus electrons that are released to the external circuit 106.

As the above process continues, the active materials of the positive and negative electrodes 104 and 105, respectively, eventually become depleted and the reactions slow down until the battery is no longer capable of supplying electrons. At this point the battery is discharged. It is well known that, even when a liquid-cell battery is not inserted into an electrical circuit, there is often a low level reaction with the electrodes 104 and 105 that can eventually deplete the material of the electrodes. Thus, a battery can become depleted over a period of time even when it is not in active use in an electrical circuit. This period of time will vary depending on the electrolyte fluid used and the materials of the electrodes.

More recently, batteries having at least one nanostructured surface have been proposed wherein nanostructures are used to separate the electrolyte from the electrode until such a time that the battery is to be used. An example of the use of electrowetting principles applied to batteries is described in copending U.S. patent application Ser. No. 10/716,084 filed Nov. 18, 2003 and entitled "Electrowetting Battery Having Nanostructured Surface," which is hereby incorporated by reference herein in its entirety. As disclosed in the '084 application, when it is desired that the battery generate a charge, the electrolyte is caused to penetrate the nanostructured surface and to come into contact with the electrode of the battery, thus resulting in the above-discussed flow of electrons around a circuit. Such a penetration of nanostructures is achieved, for example, by applying a voltage to the nanostructures such that the contact angle of the electrolyte relative to the nanostructured surface is decreased. When the contact angle is decreased, the electrolyte penetrates the nanostructures and is brought into contact with the electrode.

SUMMARY OF THE INVENTION

The present inventors have recognized the electrolyte in batteries is often a highly toxic chemical, thereby presenting disposal concerns once a battery has reached its end of life.

Therefore, the present inventors have invented a cell-array battery having end-of-life cells that can be activated at the end of a battery's life to, illustratively, alter the toxic chemicals inside the battery. In one embodiment, a battery comprises an electrode having a plurality of nanostructures disposed in a plurality of cells on a surface of the electrode. The nanostructures function to separate an electrolyte of the battery from the electrode until, upon being caused to penetrate the nanostructures in a first portion of cells, the electrolyte contacts the electrode, thus initiating a current. Neutralization of the electrolyte in the battery is achieved through immobilization of the electrolyte at the end of the life of the battery. Such immobilization is accomplished, for example, by a vitrification process, initiated at the end of a battery's life. Using electrowetting techniques, the electrolyte is made to contact a substance between the nanostructures in one or more end-of-life cells, thus causing a reaction that results in the electrolyte becoming encased in, for example, a polymer substance.

In a second illustrative embodiment, when the electrolyte contacts the substance between the nanostructures in one or more end-of-life cells, the chemical composition of the electrolyte is changed into a less toxic chemical compound, thus altering the electrolyte.

DETAILED DESCRIPTION

Figure 1:
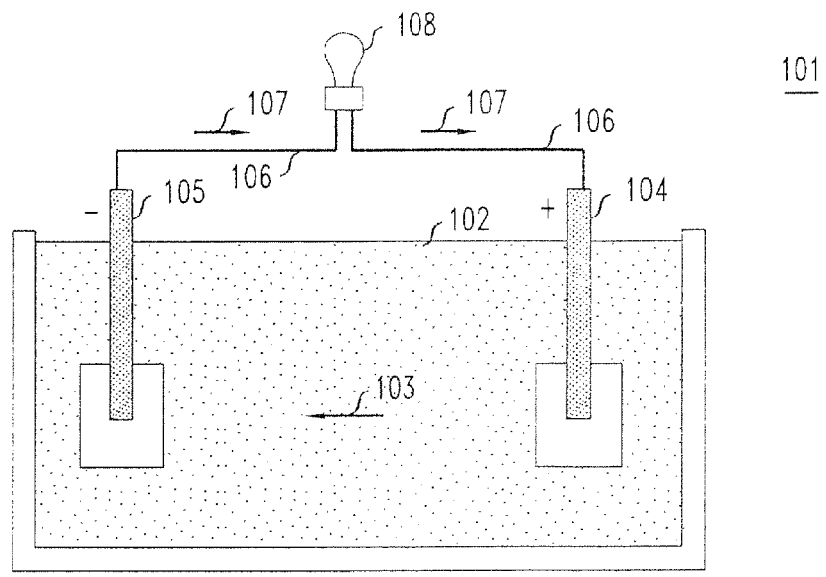
FIG. 1 shows a prior art liquid-cell battery as used in an electrical circuit.
Figure 2:
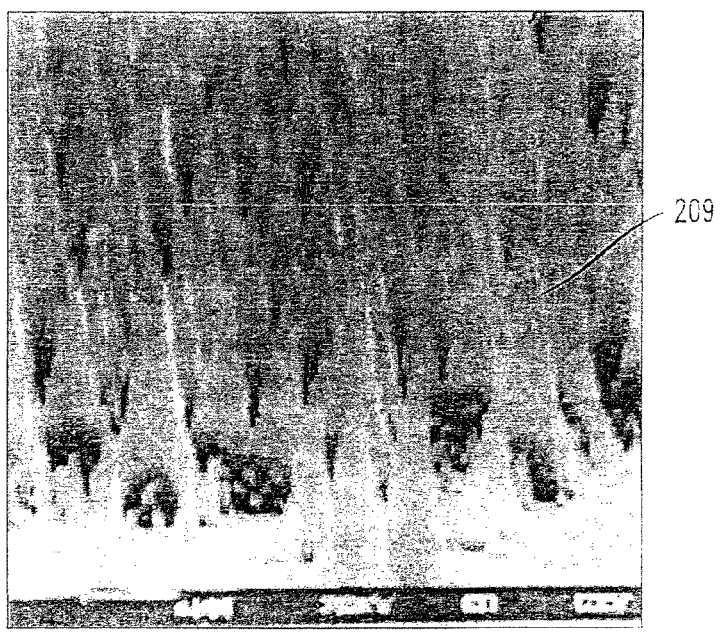
FIG. 2 shows a prior art nanopost surface.

FIG. 2 shows an illustrative nanopost pattern 201 with each nanopost 209 having a diameter of less than 1 micrometer. While FIG. 2 shows nanoposts 209 formed in a somewhat conical shape, other shapes and sizes are also achievable. In fact, cylindrical nanopost arrays have been produced with each nanopost having a diameter of less than 10 nm. Specifically, FIGS. 3A-3E show different illustrative arrangements of nanoposts produced using various methods and further show that such various diameter nanoposts can be fashioned with different degrees of regularity. Moreover, these figures show that it is possible to produce nanoposts having various diameters separated by various distances. An illustrative method of producing nanoposts, found in U.S. Pat. No. 6,185,961, titled "Nanopost arrays and process for making same," issued Feb. 13, 2001 to Tonucci, et al, is hereby incorporated by reference herein in its entirety. Nanoposts have been manufactured by various methods, such as by using a template to form the posts, by various means of lithography, and by various methods of etching.

Figure 3A:
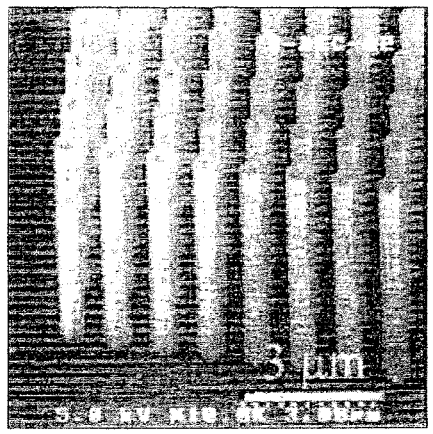
FIGS. 3A, 3B, 3C, 3D and 3E show various prior art nanostructure feature patterns of predefined nanostructures that are suitable for use in the present invention.
Figure 3B:
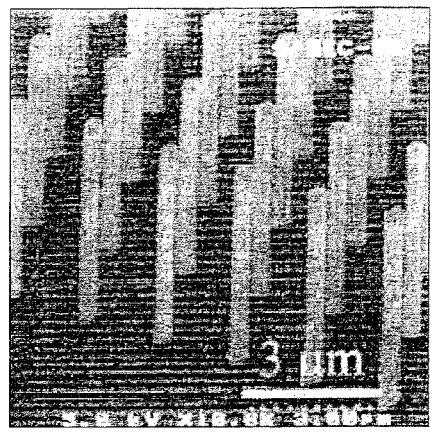
Figure 3C:
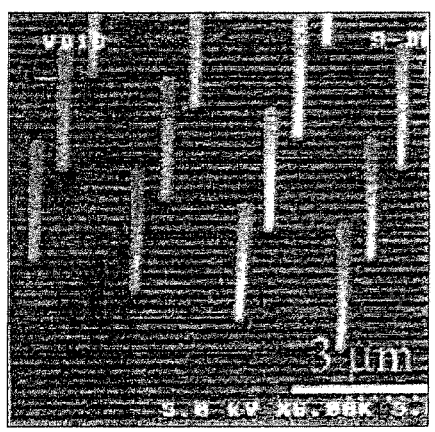
Figure 3D:
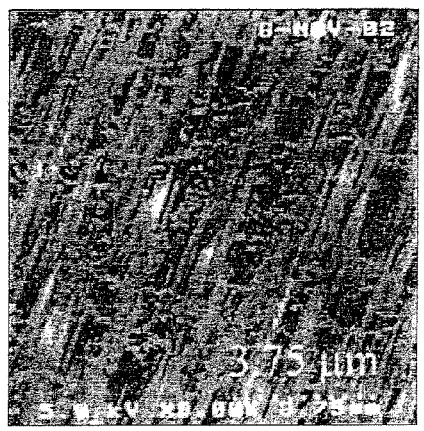
Figure 3E:
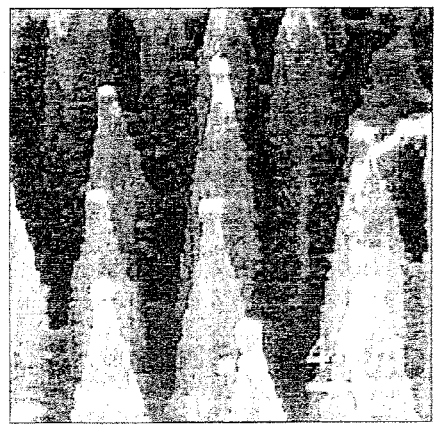
Figure 4:
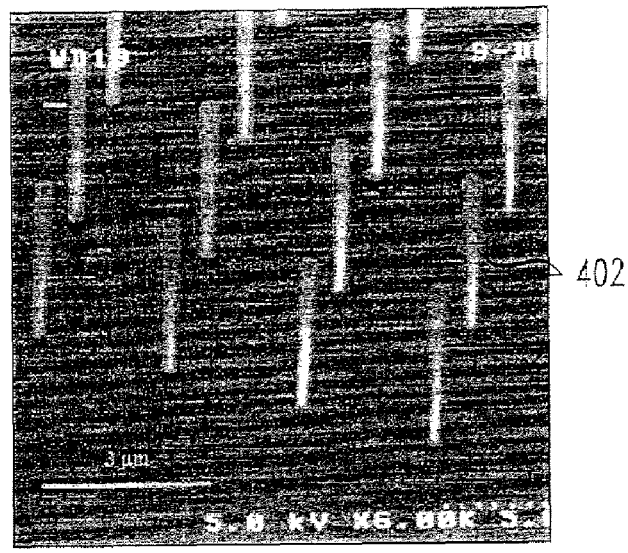
FIG. 4 shows a more detailed view of the prior art nanostructure feature pattern of FIG. 3C.

FIG. 4 shows the illustrative known surface 401 of FIG. 3C with a nanostructure feature pattern of nanoposts 402 disposed on a substrate. Throughout the description herein, one skilled in the art will recognize that the same principles applied to the use of nanoposts or nanostructures can be equally applied to microposts or other larger features in a feature pattern. The surface 401 and the nanoposts 402 of FIG. 4 are, illustratively, made from silicon. The nanoposts 402 of FIG. 4 are illustratively approximately 350 nm in diameter, approximately 6 μm high and are spaced approximately 4 μm apart, center to center. It will be obvious to one skilled in the art that such arrays may be produced with regular spacing or, alternatively, with irregular spacing. Also, it will also be obvious that the nanoposts/nanostructures described herein may be manufactured from other materials, such as polymers or carbon tubes, for example.

As typically defined a "nanostructure" is a predefined structure having at least one dimension of less than one micrometer and a "microstructure" is a predefined structure having at least one dimension of less than one millimeter. However, although the disclosed embodiments refer to nanostructures and nanostructured surfaces, it is intended by the present inventors, and will be clear to those skilled in the art, that microstructures may be substituted in many cases. Accordingly, the present inventors hereby define nanostructures to include both structures that have at least one dimension of less than one micrometer as well as those structures having at least one dimension less than one millimeter. The term "feature pattern" refers to either a pattern of microstructures or a pattern of nanostructures. Further, the terms "liquid," "droplet," and "liquid droplet" are used herein interchangeably. Each of those terms refers to a liquid or a portion of liquid, whether in droplet form or not.

Figure 5A:
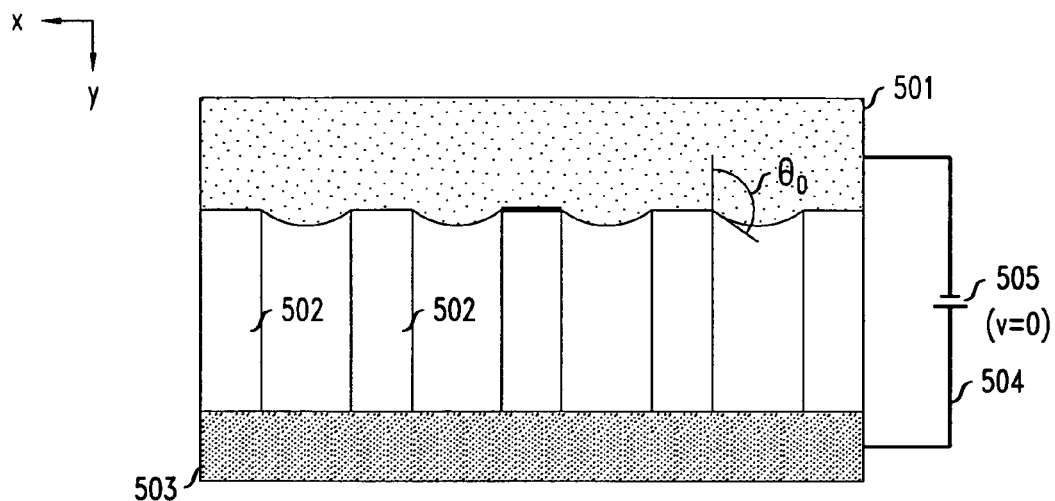
FIGS. 5A and 5B show a device in accordance with the principles of the present invention whereby electrowetting principles are used to cause a liquid droplet to penetrate a nanostructure feature pattern.
Figure 5B:
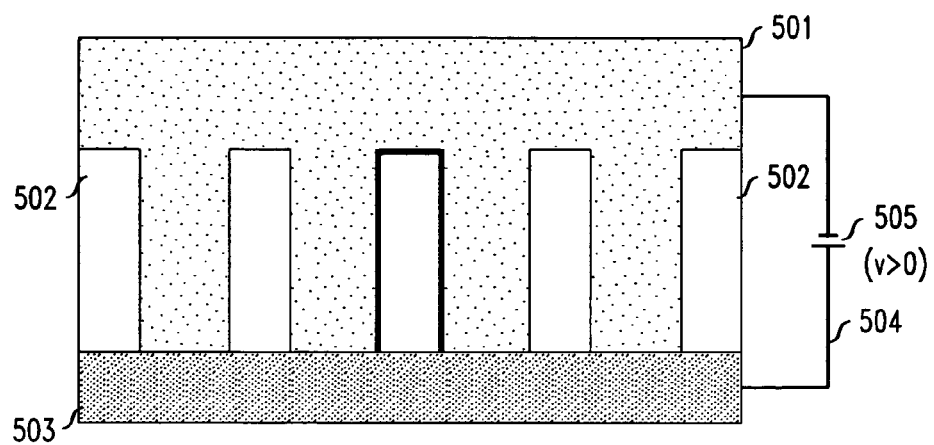

FIGS. 5A and 5B show how it is possible to control the penetration of a given liquid into a given nanostructured or microstructured surface and, thus, control the contact of the liquid with the underlying substrate supporting the nanostructures or microstructures. FIGS. 5A and 5B show one embodiment where electrowetting is used to control the penetration of a liquid into a nanostructured surface. Electrowetting principles and controlling the movement of a liquid across a nanostructured or microstructured surface are generally described in U.S. patent application Ser. No. 10/403,159 filed Mar. 31, 2003 and titled "Method And Apparatus For Variably Controlling The Movement Of A Liquid On A Nanostructured Surface," which is hereby incorporated by reference herein in its entirety. As discussed previously, the general use of electrowetting principles in batteries is described in above-referenced copending U.S. patent application Ser. No. 10/716,084.

Figure 6:
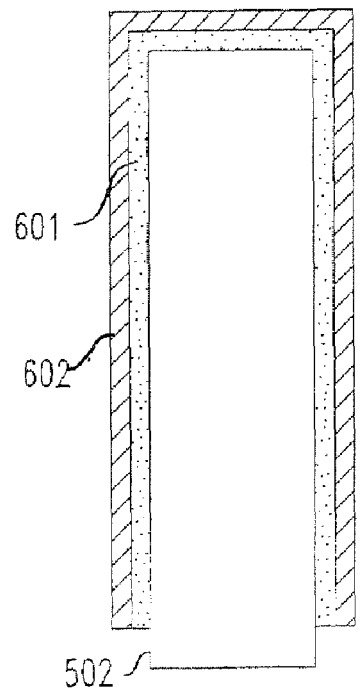
FIG. 6 shows the detail of an illustrative nanopost of the nanostructure feature pattern of FIGS. 5A and 5B.

Referring to FIG. 5A, a droplet 501 of conducting liquid (such as an electrolyte solution in a liquid-cell battery) is disposed on nanostructure feature pattern of cylindrical nanoposts 502, as described above, such that the surface tension of the droplet 501 results in the droplet being suspended on the upper portion of the nanoposts 502. In this arrangement, the droplet only covers surface area $f_1$ of each nanopost. The nanoposts 502 are supported by the surface of a conducting substrate 503. Droplet 501 is illustratively electrically connected to substrate 503 via lead 504 having voltage source 505. An illustrative nanopost is shown in greater detail in FIG. 6. In that figure, nanopost 502 is electrically insulated from the liquid (501 in FIG. 5A) by material 601, such as an insulating layer of dielectric material. The nanopost is further separated from the liquid by a low surface energy material 602, such as a well-known fluoro-polymer. Such a low surface energy material allows one to obtain an appropriate initial contact angle between the liquid and the surface of the nanopost. It will be obvious to one skilled in the art that, instead of using two separate layers of different material, a single layer of material that possesses sufficiently low surface energy and sufficiently high insulating properties could be used.

FIG. 5B shows that, by applying a low voltage (e.g., 10-20 volts) to the conducting droplet of liquid 501, a voltage difference results between the liquid 501 and the nanoposts 502. The contact angle between the liquid and the surface of the nanopost decreases and, at a sufficiently low contact angle, the droplet 501 moves down in the y-direction along the surface of the nanoposts 502 and penetrates the nanostructure feature pattern until it complete surrounds each of the nanoposts 502 and comes into contact with the upper surface of substrate 503. In this configuration, the droplet covers surface area $f_2$ of each nanopost. Since $f_2 >> f_1$, the overall contact area between the droplet 501 and the nanoposts 502 is relatively high such that the droplet 501 contacts the substrate 503. One skilled in the art will recognize that other methods of causing the electrolyte to penetrate the nanostructures, such as increasing the temperature of the electrodes, can be used. The present invention is intended to encompass any such method of causing such penetration.

Figure 7:
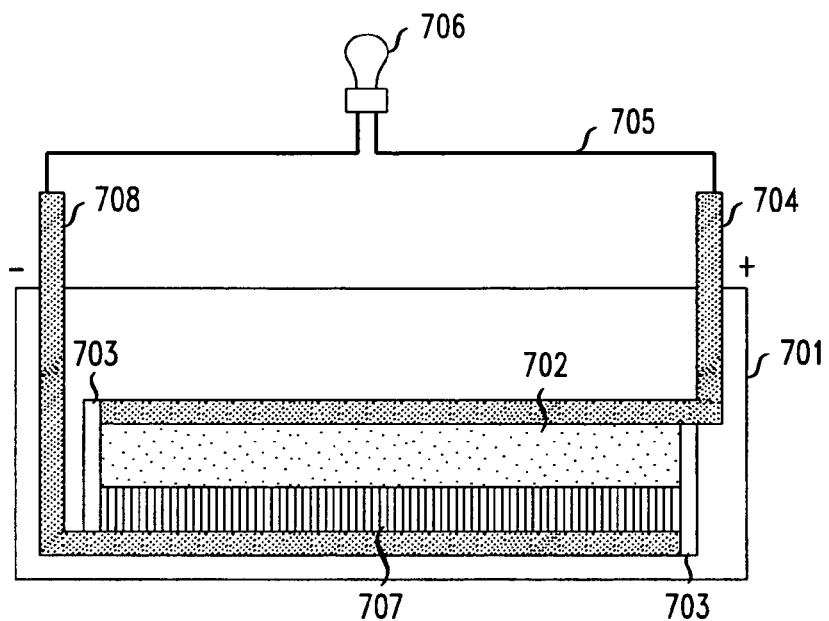
FIG. 7 shows an illustrative liquid-cell battery in accordance with the principles of the present invention wherein the electrolyte in the battery is separated from the negative electrode by nanostructures.

FIG. 7 shows an illustrative battery 701 whereby an electrolyte fluid 702 is contained within a housing having containment walls 703. The electrolyte fluid 702 is in contact with positive electrode 704, but is separated from negative electrode 708 by nanostructured surface 707. Nanostructured surface 707 may be the surface of the negative electrode or, alternatively, may be a surface bonded to the negative electrode. One skilled in the art will recognize that the nanostructured surface could also be used in association with the positive electrode with similarly advantageous results. In FIG. 7, the electrolyte fluid is suspended on the tops of the nanoposts of the surface, similar to the droplet of FIG. 5A. The battery 701 is inserted, for example, into electrical circuit 705 having load 706. When the electrolyte liquid is not in contact with the negative electrode, there is substantially no reaction between the electrolyte and the electrodes 704 and 705 of the battery 701 and, therefore, there is no depletion of the materials of the electrodes. Thus, it is possible to store the battery 701 for relatively long periods of time without the battery becoming discharged.

Figure 8:
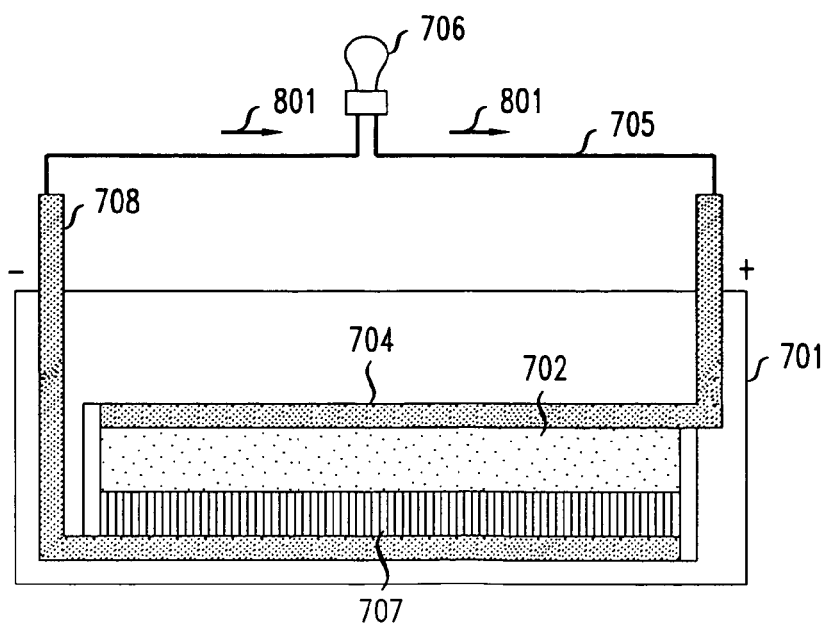
FIG. 8 shows the illustrative battery of FIG. 7 wherein the electrolyte in the battery is caused to penetrate the nanostructures and to thus contact the negative electrode.

FIG. 8 shows the battery 701 of FIG. 7 inserted into electrical circuit 705 wherein, utilizing the electrowetting principles described above, a voltage is passed over the nanostructured surface 707 thus causing the electrolyte fluid 702 to penetrate the surface 707 and to come into contact with the negative electrode 708. One skilled in the art will recognize that this voltage can be generated from any number of sources such as, for example, by passing one or more pulses of RF energy through the battery. When the penetration of the electrolyte into the nanostructures occurs, electrons begin flowing in direction 801 along the circuit 705 as described above and the load 706 is powered. Thus, the embodiment of FIGS. 7 and 8 show how a battery can be stored without depletion for a relatively long period of time and can then be "turned on" at a desired point in time to power one or more electrical loads in an electrical circuit.

In a recent attempt of a nanostructured battery, referred to herein as a cell-array battery, at least one electrode in the battery has been divided into cells. By selectively limiting the penetration of the electrolyte into only specific cells, the voltage and current generated by the battery can be accurately controlled and the life of the battery can be better managed. This attempt is described in U.S. patent application Ser. No. 10/803,641, filed simultaneously herewith, entitled "Reserve Cell-Array Nanostructured Battery" the entirety of which is hereby incorporated by reference herein.

Figure 9:
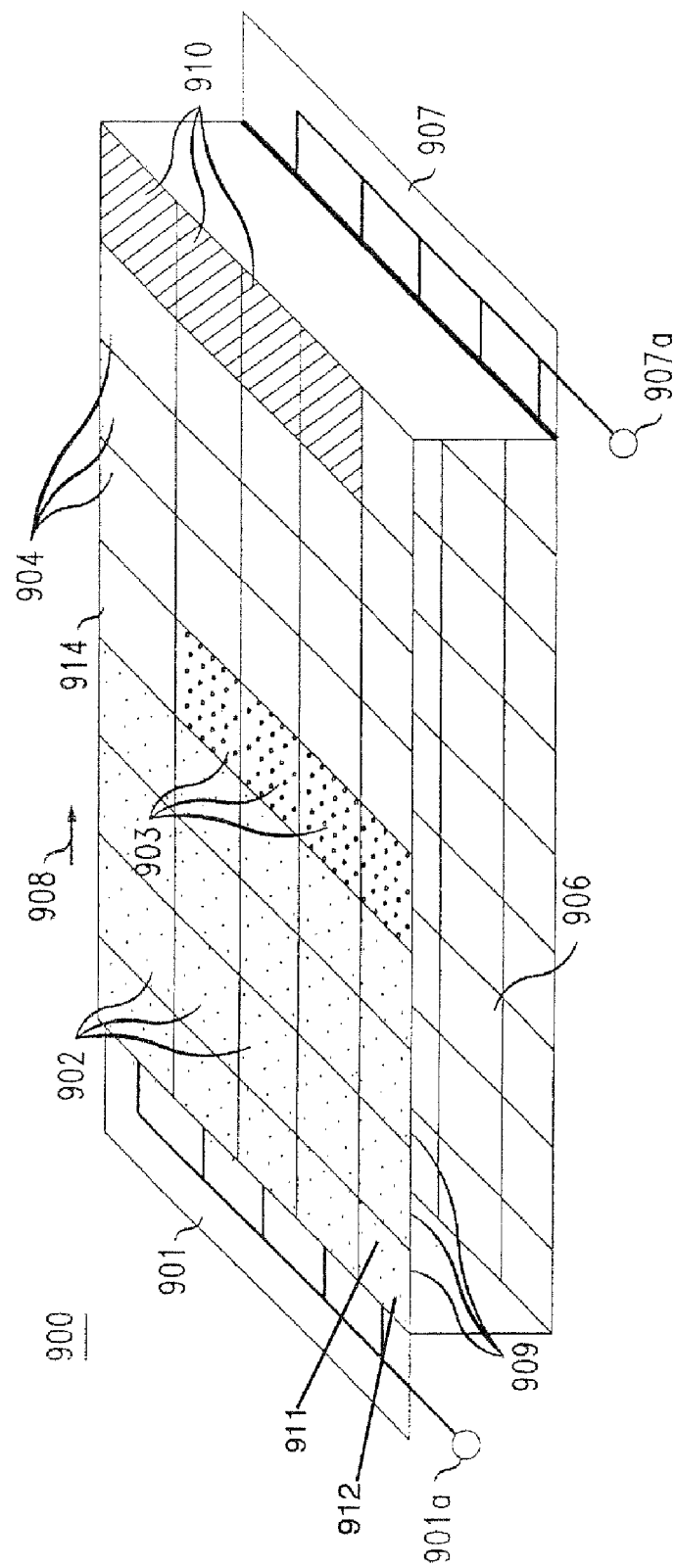
FIG. 9 shows an illustrative array of cells useful in accordance with the principles of the present invention.

FIG. 9 shows one embodiment in accordance with the principles of the present invention whereby a portion of cells in a cell-array nanostructured battery are used for a purpose other than generating a voltage. For example, one such use would be to designate the last cells in a cell-array as "end of life" cells. As used herein, end-of-life cells refers to those cells that are the last cells used in the life of a cell-array battery. One skilled in the art will recognize, however, that the cells described herein below could be disposed at any position in said array of cells. Referring to FIG. 9, battery 900 has positive electrode 901 and negative electrode 907 which are, illustratively, parallel plate electrodes. Leads 901a and 907a are, for example, electrically conductive leads useful for connecting the battery to an electrical load. Electrolyte 906, which is any one of well-known electrolytes suitable for use in battery 900, is contained within a cavity separating electrodes 901 and 907. Each of the electrodes 901 and 907 has at least one surface that is exposed to the electrolyte in a way such that, when active, an electrical current is generated by the battery, due to the reactions between the electrolyte and electrodes, as described previously. The portion of the surface of electrode 901 that is exposed to the electrolyte is illustratively a nanostructured surface, similar to the nanostructured electrode 707 in FIG. 7. One skilled in the art will recognize that portions of both electrode 901 and electrode 907 may be nanostructured similar to electrode 707.

The illustrative battery 900 of FIG. 9 functions in similar fashion to the battery 701 of FIG. 7. However, as described more fully in the above-referenced Ser. No. 11/803,565 application entitled "Nanostructured Cell-Array Battery," filed simultaneously herewith, the battery 900 of FIG. 9 permits greater control over the current and/or voltage produced by the battery, as well as better control over the life of the battery. Specifically, such control is achieved by dividing at least one electrode in the battery into an array of cells, or pixels. The array of cells is arranged in columns and rows, such as, illustratively, columns 909 of cells and rows 910 of cells. By allowing the electrolyte to penetrate only one or more particular cells in the array, for example by only passing a low voltage over the nanostructures in those cells, the current/voltage produced by the battery 900 can be selected at a particular desired level depending on the application. Thus, for example, at a point during the active life of the battery, cells 903 on the positive electrode, for example, are currently active, cells 902 are cells that have already been depleted and cells 904 are those cells that have not been activated. By progressively activating the cells in direction 908, for example, a desired voltage/current level and/or battery life may be maintained.

As is well known, batteries such battery 900 in FIG. 9 generate highly toxic and/or corrosive chemicals, thereby presenting safety and disposal concerns once a battery has reached its end of life. Therefore, the present inventors have invented a cell-array battery having end-of-life cells that can be activated at the end of a battery's life to, illustratively, alter the toxic or corrosive chemicals inside the battery. One example of a desirable alteration of the chemicals would be to neutralize those chemicals. Referring again to FIG. 9, in addition to active cells 903, depleted cells 902 and unused cells 904, illustrative electrode 901 also has end-of-life cells useful for altering the electrolyte once, for example, the battery has become substantially depleted. One skilled in the art will recognize that the end-of-life cells do not have to be used only after all cells have been depleted and that they can be used at any time to alter the electrolyte. Neutralization/altering of the electrolyte in the battery is achieved through immobilization or, in other words, vitrification. Alternatively, the electrolyte is altered by chemical reaction wherein the chemical composition of the electrolyte is changed to a less toxic chemical compound.

In the case whereby the electrolyte is to be immobilized (vitrified), a vitrifying substance 911 is disposed in the end-of-life cells 909 such that the substance is separated from the electrolyte by the nanostructures disposed in those cells. Thus, for example, once all unused cells of the electrode are depleted, the electrolyte liquid is caused to penetrate the nanostructures in cells 909, thus causing the vitrifying substance 911 to be released. One illustrative embodiment of how to achieve such a vitrification is to dispose monomers and polymerization initiators into the end of life cells. Illustratively, a mixture of di-functional and multifunctional monomers are used to insure high cross-link density of the polymer material once it is released. Such a high cross-link density increases the thermal stability of the polymer glass. In addition, a high crosslink density would increase diffusion rates of small molecules within the polymer glass matrix. Illustratively, the multifunctional monomer (i.e., >2 reactive groups per molecule) is dissolved in a water soluble monomer, such as acrylamide, vinyl alcohol, polyethyleneglycol 400 diacrylate, or other suitable monomer. The multifunctional monomer which may be, illustratively, dipentaerythritol pentaacrylate, is dissolved into the water soluble monomer as most multifunctional monomers are not sufficiently water soluble. The polymerization initiator, illustratively Benzoyl Peroxide, is for example stored in separate end of life cells. Monomer groups that could react with the electrolyte would provide additional benefits. For example, incorporation of acrylic acid monomer, which is miscible in water, would both immobilize and neutralize an alkaline electrolyte.

Prior to vitrification, the initiators and monomers are stored in separate cells to ensure a good shelf life. To achieve vitrification (e.g., at the end of a battery's life), the monomers and initiators can be mixed in a way such that they auto-polymerize, thus encapsulating the toxic/hazardous battery cell materials into a polymer glass. One skilled in the art will recognize that an energy source may be used to provide additional control over this initiation process. One illustrative monomer/initiator formulation that is suitable for use in vitrification would consist of the following compounds: Highly ethoxylated trimethylolpropane triacrylate (69%), dipentaerythritol pentaacrylate (8%), water (20%) and benzoyl peroxide (4%).

In a second illustrative embodiment, instead of vitrification, when the electrolyte contacts a substance 912 between the nanostructures in one or more end-of-life cells, the chemical composition of the electrolyte is changed into a less toxic chemical compound, thus altering (eg., neutralizing) the electrolyte. This is achieved, for example, by using an altering compound 912 in place of the vitrification substance described above. Once all unused cells of the electrode are depleted, the electrolyte liquid is brought into contact with the altering compound 912, thus beginning a chemical reaction between the electrolyte and the altering chemical 912 that results in the electrolyte becoming less toxic. One illustrative example of how a battery can be altered is shown by a particular type of Lithium battery. Specifically, many Lithium batteries use the toxic solvent thionyl chloride, thus forming what is known as a Lithium thionyl chloride (LiSOCl$_2$) battery. Such batteries are desirable in many applications due to their relatively light weight, low discharge rate, long shelf life, and relatively high voltage output per cell when compared to other batteries. Due to these qualities, such batteries are becoming more widely used. With increasing use, altering or otherwise altering the toxic thionyl chloride in those batteries after the battery has become discharged is highly desirable.

One chemical useful in, illustratively, altering the thionyl chloride in LiSOCl$_2$ batteries is a solution of calcium hydroxide (Ca(OH)$_2$). This solution could be, illustratively, disposed in an enclosed end-of-life cell and, upon contacting the calcium hydroxide, the thionyl chloride will react into a harmless mixture of calcium salts. Specifically, the following reactions would result:

$$SOCl_{2(l)} + 2H_2O \leftrightarrow SO_2 + 2HCl_{(aq)} \quad (1)$$

$$SO_2 + H_2O \leftrightarrow H_2SO_{3(aq)} \quad (2)$$

$$H_2SO_{3(aq)} + Ca(OH)_{2(aq)} \leftrightarrow CaSO_{3(aq)} + 2H_2O \quad (3)$$

$$2CaSO_{3(aq)} + O_2 \leftrightarrow 2CaSO_{4(aq)} \quad (4)$$

$$2HCl_{(aq)} + Ca(OH)_{2(aq)} \leftrightarrow CaCl_{2(aq)} + 2H_2O \quad (5)$$

Thus, the overall neutralization reaction is:

$$2SOCl_{2(l)} + 4Ca(OH)_{2(aq)} + O_{2(aq)} \leftrightarrow 2CaSO_{4(aq)} + 2CaCl_{2(aq)} + 4H_2O$$

Accordingly, the calcium salts CaCl$_2$ and CaSO$_4$ dissolved in water would be formed by the reaction between the calcium hydroxide and thionyl chloride. The oxygen commonly dissolved in aqueous solutions would oxidize the SO$_3$ anion to SO$_4$—. One skilled in the art will recognize that different altering substances may be used depending on the battery chemical composition.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. For example, while the embodiment disclosed herein is a battery having nanostructured surfaces, one skilled in the art will appreciate that such nanostructured surfaces may be used for other uses, such as in use as a thermostat. In such a case, the characteristics of the pattern of nanostructures and the liquid in contact with the nanostructures can be chosen in a way such that, upon a temperature increase of known amount, the liquid will penetrate the surface, thus achieving a desired result. One skilled in the art will be able to devise many similar uses of the underlying principles associated with the present invention, all of which are intended to be encompassed herein. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. An apparatus, comprising:
    a surface having a plurality of cells, including end-of-life-cell, each cell in said plurality having a corresponding plurality of nanostructures disposed between said surface and an electrolyte fluid;
    a vitrifying substance or an altering compound disposed in said end-of-life cells such that said vitrifying substance or said altering compound is separated from said electrolyte fluid by said nanostructures; and
    means for contacting said electrolyte fluid with said vitrifying substance or said altering compound in at least a first cell in said plurality of cells such that, upon contacting said vitrifying substance or said altering compound, at least a portion of said electrolyte is substantially immobilized or altered.

2. The apparatus of claim 1, wherein said means for contacting comprises means for decreasing the angle of contact between said electrolyte and said nanostructures such that said electrolyte penetrates said nanostructures.

3. The apparatus of claim 2, wherein said means for decreasing comprises means for applying a voltage to said nanostructures.

4. The apparatus of claim 1, wherein said vitrifying substance comprises multifunctional monomers and polymerization initiators.

5. The apparatus of claim 4, wherein multifunctional monomers comprises one or more acryamide, vinyl alcohol, polyethyleneglycol 400 diacrylate or acrylic acid monomers.

6. The apparatus of claim 1, wherein said apparatus is a battery.

7. The apparatus of claim 1, wherein said apparatus is a thermostat.

8. An apparatus for neutralizing an electrolyte fluid, comprising:
    a surface having a plurality of cells, each cell in said plurality having a corresponding plurality of nanostructures disposed between said surface and said electrolyte fluid;
    a vitrifying substance or an altering compound disposed on said surface; and
    a voltage generator for applying a voltage to said nanostructures,
    wherein, upon said voltage being applied to said nanostructures, the angle of contact between said electrolyte and said nanostructures decreases in a way such that said electrolyte penetrates said nanostructures, thus contacting said vitrifying substance or said altering compound.

9. A method for altering an electrolyte liquid in a battery, said battery comprising an electrode, said electrode comprising a surface having a plurality of nanostructures disposed thereon, said surface divided into a plurality of end-of-life cells, said method comprising:
    selectively passing a voltage across a portion of the nanostructures in said end-of-life cells in a way such that said electrolyte fluid penetrates said nanostructures and contacts a vitrifying substance or an altering compound on said surface.

10. The method of claim 9, wherein said vitrifying substance comprises multifunctional monomers and polymerization initiators.

11. The method of claim 10, wherein said multifunctional monomers comprises one or more acryamide, vinyl alcohol, polyethyleneglycol 400 diacrylate or acrylic acid monomers.

12. The method of claim 9, wherein said altering compound comprises a neutralizing substance.

13. The method of claim 12, wherein said altering compound comprises calcium hydroxide.

* * * * *

UNITED STATES PATENT AND TRADEMARK OFFICE
CERTIFICATE OF CORRECTION

PATENT NO. : 7,618,746 B2  Page 1 of 1
APPLICATION NO. : 10/803576
DATED : November 17, 2009
INVENTOR(S) : Kroupenkine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1420 days.

Signed and Sealed this

Fourteenth Day of December, 2010

David J. Kappos
*Director of the United States Patent and Trademark Office*